United States Patent [19]

Lacroix

[11] 4,043,684

[45] Aug. 23, 1977

[54] HANDLE-BAR STEM

[75] Inventor: Bernard Lacroix, Montbeliard, France

[73] Assignee: Cycles Peugeot, Valentigney, France

[21] Appl. No.: 700,926

[22] Filed: June 29, 1976

[30] Foreign Application Priority Data

July 11, 1975 France .................................. 75.21919

[51] Int. Cl.² ............................................ B62K 21/18
[52] U.S. Cl. ........................................ 403/8; 403/209;
403/191; 403/235; 74/551.6
[58] Field of Search ............... 403/207, 209, 233, 235,
403/191, 236, 237, 373, 8, 7; 74/551.1, 551.6

[56] References Cited

U.S. PATENT DOCUMENTS

| 2,357,553 | 9/1944 | Schwinn | 74/551.1 UX |
| 3,361,455 | 1/1968 | Hussey et al. | 403/191 |
| 3,385,615 | 5/1968 | Hussey | 74/551.6 X |

FOREIGN PATENT DOCUMENTS 1,033,883  4/1953  France .................................. 403/191

Primary Examiner—Andrew V. Kundrat
Attorney, Agent, or Firm—Sughrue, Rothwell, Mion, Zinn and Macpeak

[57] ABSTRACT

The extension of the handle-bar stem is provided with a transverse aperture forming a collar for receiving and supporting the handle-bar. A clamping lug which extends from the collar toward the vertical arm of the stem has an upper face which defines with a lower face of the extension a slot splitting the collar. The lug and the extension are provided with apertures for the passage of a clamping device.

The extension also has an axial cavity which is extended by an opening formed in the collar. The clamping device has one end hidden in the cavity and an opposite end hidden within the thickness of the clamping lug.

4 Claims, 1 Drawing Figure

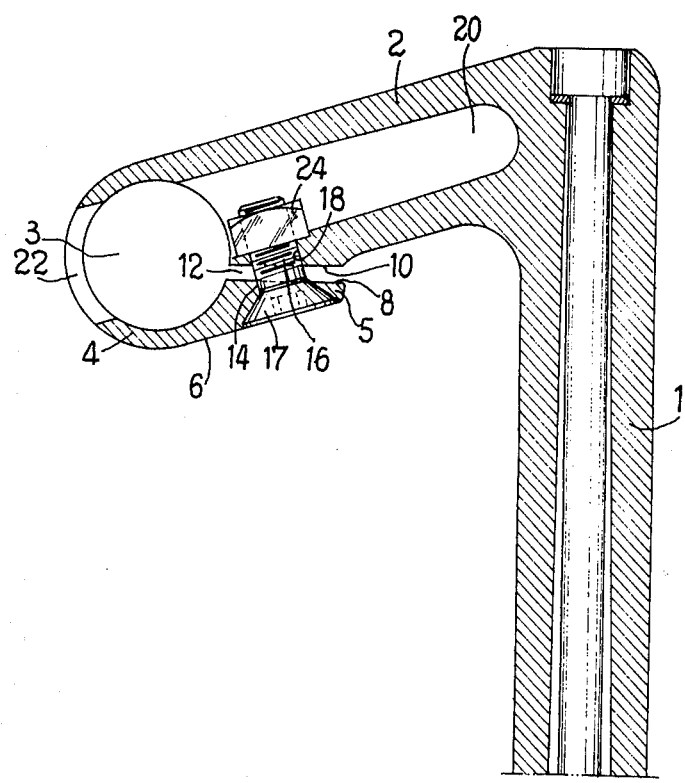

HANDLE-BAR STEM

The present invention relates to a handle-bar stem for a two-wheeled vehicle and more particularly to the means whereby this stem holds the bend of the handle-bar.

For a very long time, it has been usual to mount the bend of the handle-bar in a collar integral with the extension of the stem and to clamp it by means of a bolt or other clamping means placed in front and/or above the extension at a point where it is very visible and easily accessible. Unfortunately, it has been found that this ease of access may be a cause of an accident.

In order to improve the safety and appearance of this fixing, by placing the clamping means in a position where it is invisible and shielded from accidental contact, handle-bar stems have been proposed which form the support collar and a clamping lug and include an axial cavity for containing one of the ends of the clamping means, which cavity is closed by a pushrod having a curved surface for bearing against the handle-bar and ensuring the blocking of the clamping means.

This system is effective but complicated and delicate to disassemble and thereafter reassemble.

An object of the present invention is to provide a much simpler handle-bar stem which, however, retains the properties of safety and aesthetic appearance of the known stems.

According to the invention, there is provided a handle-bar stem comprising an extension which is hollowed out axially and forms at its end a handle-bar support collar and a clamping lug which extends from said collar in the direction of the vertical arm of the stem and has an upper face which defines with a lower face of the extension a collar-opening slot, clamping means for urging the faces of of the slot toward each other for clamping the collar directly onto the handle-bar, said clamping means having one end portion in the cavity of the extension, and an opening for access to the clamping means formed in the wall of the collar in the extension of the cavity.

The clamping means is preferably a screw and nut system of which either the nut or the head of the screw is disposed in the cavity of the extension, the opening of the collar allowing its assembly and its access at any time. It may also be constituted by a blot which cooperates with a tapped aperture of the extension or by any other suitable means having an end portion in the cavity. Its other end portion is shielded behind the bend of the handle-bar between the latter and the vertical arm or plunger tube of the stem and may be embedded in the clamping lug so that it is not only shielded from contacts but hidden from sight without rendering access thereto difficult.

The ensuing description of one embodiment given merely by way of example, with reference to the single FIGURE of the accompanying drawing, will bring out the advantages and features of the invention.

The single FIGURE shows in section the upper part of the vertical arm or plunger tube 1 of a handle-bar stem and the extension 2 which is integral with this tube. The front portion of this extension is provided with a transverse aperture 3 which defines a collar 4 for supporting a handle-bar bend (not shown). In the lower part of the extension 2, the collar 4 is extended in the direction of the tube 1 by a clamping lug 5. The lower face 6 of the lug 5 is substantially tangential to the outer surface of the collar 4 but its upper face 8 is inclined almost radially of the collar so that the lug tapers. The face 8 is in confronting relation to a similar face 10 machined in the extension and defines with the face 10 a slot 12 which opens the collar 4.

The lug 5 is provided with an aperture 14 which is outwardly divergent and has extending therethrough a clamping means which extends into a corresponding aperture 18 formed in the extension 2. This aperture 18 opens onto a cavity 20 formed axially in the extension and an opening 22 is formed in the collar exactly in the extension of the cavity 20. The clamping means is constituted by a screw 16 inserted in the aperture 14 so that its head 17 occupies the divergent part of the aperture and is flush with the face 6 of the lug 5.

The screw 16 also extends through the aperture 18 and projects inside the cavity 20. A nut 24 is screwed on the screw 16 inside the cavity 20 so as to regulate the distance between the lug 5 and the face 10 and thereby clamp the bend of a handle-bar placed inside the collar and hold it in position.

The clamping means constituted by the assembly of the screw 16 and the nut 24 is shielded from any accidental contact, since it is protected by the bend of the handle-bar. Moreover, it forms no projection on the resulting assembly when it is tightened and there is no risk of its producing any hindrance.

It will be understood that the screw and nut system may be mounted in the opposite direction, with the head 17 of this screw placed inside the cavity 20 and the nut 24 embedded in the aperture 14, the latter having a suitable shape.

The screw and nut system may if desired by replaced by a screw or a bolt alone whose end portion is disposed and shielded in the cavity 20, the aperture 16 or the aperture 14 being tapped.

Whatever be the chosen embodiment, the device is very simple in construction and easy to position. It also has a great advantage in that there is no risk of the device becoming accidentally untightened and it forms no dangerous projection and is practically invisible.

Having now described my invention what I claim as new and desire to secure by Letters Patent is:

1. A handle-bar stem comprising a plunger tube for insertion in a fork tube of a wheeled vehicle, an extension extending laterally from the plunger tube, the extension carrying a collar defining a transverse aperture for receiving a handle-bar at an end of the extension remote from the plunger tube, a clamping lug extending from the collar toward the plunger tube and having an upper face, the extension having a lower face which defines with said upper face a slot extending through the collar into said aperture so that the collar is a split collar, the extension having an axial cavity and means defining an opening in the collar substantially in alignment with said cavity, and clamping means having a first end portion engaged in said cavity and an opposite second end portion engaged with said lug for urging said upper face and lower face toward each other and thereby clamping the collar around the handle-bar in said aperture.

2. A handle-bar stem as claimed in claim 1, wherein the clamping lug has an outwardly divergent aperture in which aperture the second end portion of the clamping means is embedded.

3. A handle-bar stem as claimed in claim 1, wherein the clamping means is constituted by a system comprising a screw element and a nut element, one of said system elements being disposed in said cavity and the other system element being embedded in the clamping lug.

4. A handle-bar stem as claimed in claim 1, wherein the upper face of the clamping lug and the lower face of the extension are inclined substantially on a radius through the centre of the collar.

* * * * *